US 6,536,236 B2

(12) United States Patent
Grossman et al.

(10) Patent No.: US 6,536,236 B2
(45) Date of Patent: Mar. 25, 2003

(54) METHOD OF MAKING A POLARIZING GLASS

(75) Inventors: David G. Grossman, Corning, NY (US); Lisa R. Vandegrift, Akron, OH (US); Joseph M. Williams, Horseheads, NY (US); George N. Whitbred, III, Campbell, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/906,182

(22) Filed: Jul. 16, 2001

(65) Prior Publication Data

US 2002/0053221 A1 May 9, 2002

Related U.S. Application Data

(63) Continuation-in-part of application No. 09/269,462, filed on Mar. 23, 1999, now abandoned.

(51) Int. Cl.$^7$ ............................................. C03C 23/00
(52) U.S. Cl. ..................... 65/30.11; 65/30.1; 65/32.1; 65/32.3; 65/33.1
(58) Field of Search ........................ 65/30.1, 30.11, 65/32.1, 32.3, 33.1

(56) References Cited

U.S. PATENT DOCUMENTS

| 3,653,863 A | 4/1972 | Araujo et al. ............... 65/30 |
| 4,190,451 A | 2/1980 | Hares et al. ................ 106/47 |
| 4,405,672 A | 9/1983 | Araujo et al. ............... 428/68 |
| 4,908,054 A | 3/1990 | Jones et al. ............... 65/30.11 |
| 5,430,573 A | 7/1995 | Araujo et al. ............... 359/361 |

FOREIGN PATENT DOCUMENTS

| EP | 0 719 742 B1 | 7/1996 |
| EP | 0 719 741 B1 | 9/1996 |

*Primary Examiner*—James Derrington
(74) *Attorney, Agent, or Firm*—Vincent T. Kung; Milton M. Peterson

(57) ABSTRACT

A method of producing a polarizing glass article that exhibits a broad band of high contrast polarizing properties in the infrared region of the radiation spectrum. The polarizing glass is phase-separated or exhibits photochromic properties based on silver, copper, or copper-cadmium halide crystals or a combination thereof, which are precipitated in the glass and having a size in the range of 200–5000 Å. The glass has a surface layer containing elongated silver, copper, or copper cadmium metal particles, or a mixture thereof. The method comprises subjecting the glass article to a time-temperature cycle in which the temperature is at least about 76° C. or greater above the glass softening point, in a step to thermally form and precipitate large halide crystals, and elongated metallic particles under a stress of not over about 3000 psi, preferably not over about 2675 psi.

12 Claims, 2 Drawing Sheets

METHOD OF MAKING A POLARIZING GLASS

CONTINUATION-IN-PART

This Application is a continuation-in-part to U.S. patent application Ser. No. 09/269,462, of the same title, filed on Mar. 23, 1999, now abandoned, in the names of David G. Grossman, Lisa R. Vandergrift, Joseph M. Williams, and George N. Whitbred, III.

FIELD OF THE INVENTION

The present invention relates to a method of making a polarizing article from a phase-separated glass containing silver, copper, or copper-cadmium halide crystals.

BACKGROUND OF THE INVENTION

Over the years many have developed and practiced various techniques for precipitating silver, copper, or copper-cadmium halide crystals by heat treating glasses with compositions containing the respective metals and a halogen other than fluorine, in suitable amounts. The glasses that result usually exhibit photochromic behavior, that is, they darken and fade in color, respectively, in response to the application and removal of short wavelength radiation. It is possible, however, to produce glasses which contain the indicated crystals, but which are not photochromic.

Stretching the glass within a certain viscosity range can generate a birefringent effect in these crystal-containing glasses. The glass is placed under stress at a temperature above the glass strain point temperature. This elongates the glass, and thereby elongates and orients the crystals within. The elongated article is then exposed to a reducing atmosphere at a temperature above 250° C., but not exceeding 25° C. above the glass annealing point. This develops a surface layer in which at least a portion of the halide crystals is reduced to elemental metal. The elongated elemental crystals provide an array of electric dipoles that preferentially interact with the electric field vector of incident light. This provides a method to polarize light waves that are transmitted through it.

The production of a polarizing glass involves, broadly, four basic steps:

1. Melting a glass batch containing a source of silver, copper, or copper-cadmium and a halogen other than fluorine, and forming a body from the melt;
2. Heat treating the glass body at a temperature above the glass strain point to generate halide crystals having a size in the range of 200–5000° C.;
3. Stressing the crystal-containing glass body at a temperature above the glass strain point to elongate the body and thereby elongate and orient the crystals; and
4. Exposing the elongated body to a reducing atmosphere at a temperature above 250° C. to develop a reduced surface layer on the body that contains metal particles with an aspect ratio of at least 2:1.

The glass articles produced according to the general method tend to display excellent polarizing properties over the infrared portion of the radiation spectrum, preferably within the region of 600–2000 nm (6000–20,000 Å). Typically, stretching the glass within a certain viscosity range can generate a birefringent effect in these crystal-containing glasses. The glass is placed under stress at a temperature above the glass strain point temperature. The stress elongates the glass, and thereby elongates and orients the crystals. The elongated article is then exposed to a reducing atmosphere at a temperature above 250° C., but not to exceed over 25° C. above the glass annealing point. The reducing atmosphere develops a surface layer in the glass in which at least a portion of the halide crystals is reduced to elemental metal. The elongated elemental metals provide an array of electric dipoles, which preferentially reacts with the electric field vector of incident light. This phenomenon provides a method to polarize transmitted light waves.

The growth of halide particles cannot occur at temperatures below the strain point of the glass because the viscosity of the glass is too high. Therefore, temperatures above the annealing point are preferred for crystal precipitation. Where physical support is provided for the glass body, temperatures up to 50° C. above the softening point of the glass can be employed.

Experience has demonstrated that the halide crystals should have a diameter of at least about 200 Å in order to assume upon elongation, an aspect ratio of at least 5:1. When reduction to elemental particles occurs, the particles having an aspect ratio of at least 5:1 will display an aspect ratio greater than 2:1. This places the long wavelength peak at least near the edge of the infrared region of the radiation spectrum, while avoiding serious breakage problems during the subsequent elongation step. At the other extreme, the diameter of the initial halide particles should not exceed about 5000 Å. This precludes the development of significant haze in the glass accompanied with a decreased dichroic ratio resulting from radiation scattering.

The dichroic ratio is a measure of the polarizing capability of a glass. It is defined as the ratio existing between the absorption of radiation parallel to the direction of elongation and the absorption of radiation perpendicular to the direction of elongation. To attain an adequate ratio, the aspect ratio of the elongated halide crystals must be at least 5:1 so that the reduced metal particles have an aspect ratio of at least 2:1.

Crystals having a small diameter demand very high elongation stresses to develop a necessary aspect ratio. Also, the likelihood of glass body breakage during a stretching-type elongation process is directly proportional to the surface area of the body under stress. This creates a very practical limitation as to the level of stress that can be applied to a glass sheet, or other body of significant mass. In general, a stress level of a few thousand psi has been deemed to comprise a practical limit, but often stress levels above 3000 psi are customarily used.

One of the key measures of the effectiveness of a polarizing glass body is its contrast ratio, or simply its contrast, as referred to in the art. Contrast comprises the ratio of the amount of radiation transmitted with its plane of polarization perpendicular to the elongation axis to the amount of radiation transmitted with its plane of polarization parallel to the elongation axis. In general, the greater the contrast, the more useful, and valuable, the polarizing body. Another important feature of a polarizing body is the bandwidth over which the body is effective. This property takes into consideration not only the degree of contrast, but also the portion of the spectrum within which the contrast is sufficiently high to be useful.

The level of contrast attainable in a polarizing glass body is dependent upon the amount of reduction occurring during the step of firing in a reducing atmosphere. Typically, the greater the extent of reduction the greater the level of contrast. Thus, employing a combination of either higher temperatures, longer times, or higher pressures of reducing gas species for reduction, can increase the degree of contrast.

That practice is limited, however, by the tendency of the metal halide particles to respheriodize. Firing of the elongated body in a reducing atmosphere is undertaken at temperatures above 250° C., but no higher than 25° C. above the annealing point of the glass. Preferably, the firing temperature is somewhat below the annealing point of the glass to prevent the particles from respheriodizing. Respheriodization or the tendency for the elongated particles to return to their original state, or to break into small particles, arises as the temperature of the reduction step, or of any other heat treatment subsequent to the elongation step, is increased. This tendency places a serious limitation on the temperature at which any such subsequent heat treatment may be undertaken.

That tendency is also enhanced by higher temperatures and longer times of firing. Respheriodization can result in a decrease in contrast and/or a narrowing of the peak absorption band, or a shifting of the peak absorption band in the direction of shorter wavelengths. To illustrate, a process for preparing polarizing glass articles in accordance with prior knowledge has utilized firing in a hydrogen atmosphere for 4 hours at 425° C. When the firing time was extended to 7 hours, the contrast was increased somewhat, but with a concurrent reduction in the bandwidth of high contrast.

U.S. Pat. No. 4,908,054 (Jones et al.) proposes a method of producing a polarizing glass body that obviates the effect of respheriodization during a heat treatment such as the reduction step. This method conducts the thermal reducing treatment under a pressure of at least twice atmospheric pressure. The effect of the pressure is to inhibit respheriodization and to produce a polarizing glass article that exhibits a relatively broad range of high contrast polarizing properties in the infrared region. This expedient is not required in the present invention, but may be employed.

It is a purpose of the present invention to provide a glass article that has excellent polarizing properties over a wide range of the radiation spectrum. Another purpose is to accomplish this with or without employing the Jones et al. expedient of enhanced pressure. A further purpose is to provide a phase-separated glass that is elongated at a relatively low stress level. A still further purpose is to produce a polarizing glass article having a relatively flat contrast absorption curve over a wide wavelength band.

SUMMARY OF THE INVENTION

The invention encompasses a method of producing a glass article that exhibits a broad band of high contrast polarizing properties in the infrared region of the radiation spectrum. The glass is phase-separated, or exhibits photochromic properties, based on silver, copper, or copper-cadmium halide crystals precipitated in the glass having a size within a range of 200–5000Å, and contains elongated silver, copper, or copper-cadmium metal particles. The method comprises thermally forming and precipitating large halide crystals in the glass article by subjecting the glass to a time-temperature cycle in which the temperature is about at least 76° C. or greater above the glass softening point, and the time is sufficient to form the crystals, preferably over one hour. Preferably the temperature applied is higher than 76° C., such as about 77° C. to about 80° C. above the glass softening point. The glass article, halide crystals, and particles within are elongated at a temperature between the strain point and the softening point of the glass.

The invention further encompasses a method for making a glass article exhibiting a relatively broad band of high contrast polarizing properties in the infrared region of the radiation spectrum from glasses which are phase-separable, or exhibit photochromic properties, through the presence of silver, copper, or copper-cadmium halide crystals, the method comprising the steps of:

(a) melting a batch for a glass containing a source of silver, copper, or copper-cadmium and at least one halogen other than fluorine or a combination thereof, (b) cooling and shaping the melt into a glass article of a desired configuration, (c) subjecting the glass article to a temperature at least about 76° C. above the softening point of the glass to generate and precipitate silver, copper, or copper-cadmium crystals in the glass, the crystals ranging in size between about 200 Å and 5000 Å, (d) elongating the glass article under stress not over about 3000 psi (preferably not over about 2500–2675 psi) at a temperature above the strain point of the glass to provide the crystals with an elongated aspect ratio of at least 5:1 and aligned in the direction of the stress, and, (e) exposing the elongated glass article to a reducing atmosphere at a temperature above about 250° C., but no higher than about 25° C. above the annealing point of the glass for a period of time sufficient to develop a reduced surface layer on the glass article wherein at least a portion of the elongated halide crystals are reduced to elemental silver, copper, or copper-cadmium particles having aspect ratios greater than 2:1 which are deposited in and/or upon said elongated crystals, whereby the glass article exhibits a relatively broad range of high contrast polarizing properties in the infrared region of the radiation spectrum.

DESCRIPTION OF THE INVENTION

The present invention details a more economical means of manufacturing glass articles that exhibit a broad band of high contrast polarizing properties in the infrared region of the radiation spectrum. The invention adopts, and improves on, a known method of producing polarizing glass bodies. U.S. Pat. No. 4,908,054 (Jones et al.) specifies what has been accepted as good practice. Generally, the method embodies the steps of melting, and forming an article from, a glass containing a source of silver, copper, or copper-cadmium and a halogen or combination thereof other than fluorine. The article is cooled and then heat-treated to form and precipitate halide crystals of silver, copper, or copper-cadmium. The article is then heated and subjected to stress to elongate the halide crystals. The glass is then subjected to a thermal reduction step, preferably in a hydrogen atmosphere, to reduce a portion of the silver or copper halide crystals in a surface layer on the article to elongated metal particles.

The present invention is concerned with a modification of the step in which the glass is heat treated to form and precipitate the halide crystal phase. Others in the past have suggested that this step may be carried out at any temperature in the range of 500–900° C. In the Jones et al. patent, for instance, the temperature is specified to be above the glass strain point, but not over 75° C. above the glass softening point. Temperatures considerably below the 75° C. over the glass softening point are disclosed in examples. The time is stated to be a sufficient time to generate halide crystals. The maximum temperature is dependent on the viscosity characteristics of the glass. In general, the temperature should not be so high that the glass becomes undesirably soft, a viscosity point of about $10^5$ poises being a practical limit.

It has now been found that new and unexpected benefits are achieved by a modified heat treatment to produce the halide crystals in the glass. In particular, the glass is heat treated at a temperature of at least about 76° C. above the softening point, and for time sufficient to develop the crystals, usually at least greater than about an hour. These higher heat treatment temperatures have produced glass blanks with larger, and a wider variety of, crystal sizes.

Figure 1:
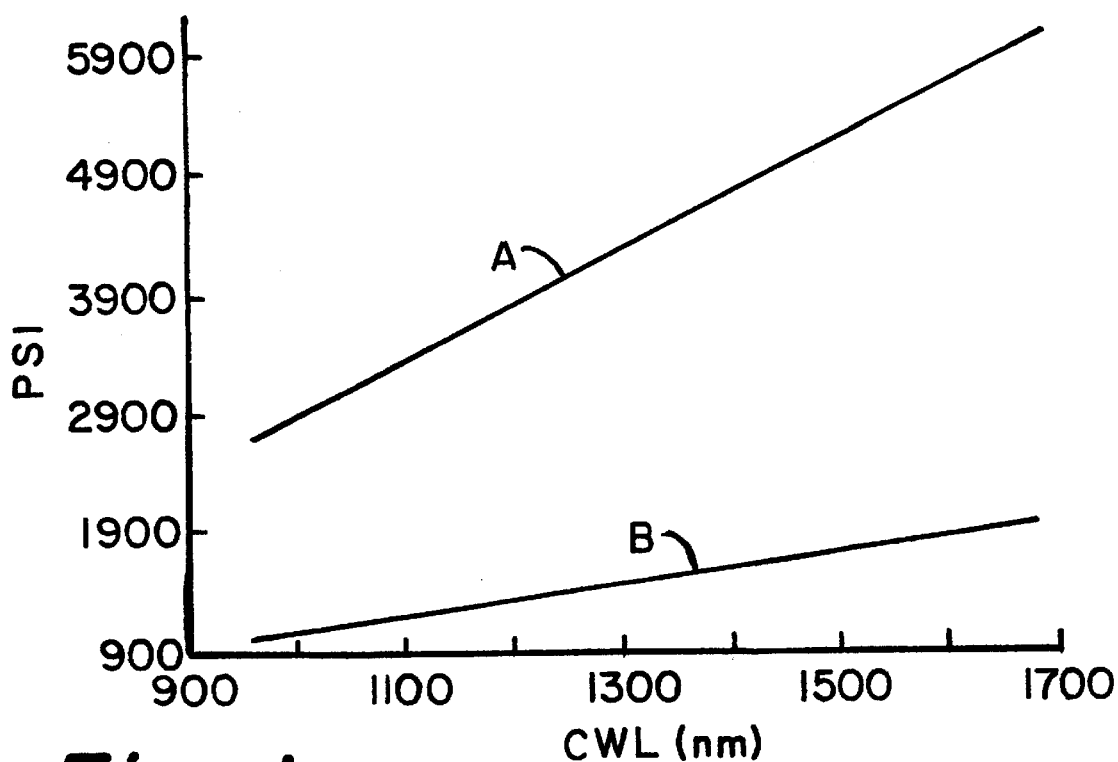
FIG. 1 is a graphical representation comparing the stress levels required in accordance with the present invention, as compared to prior practice, to achieve a given center wavelength in a polarizing glass.

The increase in metal halide crystal size permits elongating the glass at a much lower stress level, of not over about 3000 psi, preferably not over about 2675–2500 psi, and more preferably not over about 2100–2000 psi or about 1900 psi. This improves the operation and lessens the chance for breakage during the stretching process, as well as reduces overall costs. The dramatic decrease in the required pulling forces is shown in FIG. 1, which is a graphical representation of stress levels that are plotted in pounds per square inch (psi) on the vertical axis and center wavelengths (CWLs) in nanometers (nm) are plotted on the horizontal axis. The center wavelength is that particular wavelength at the center or peak of a given range of polarizing capability. For a particular application, heat-treatment conditions can be targeted to a desired wavelength.

In FIG. 1, the stress levels required to achieve a given center wavelength are compared for two heat treatment cycles. The upper line A represents data from a standard heat treatment at a temperature of 710° C. for 4 hours. This cycle is typical of the cycles employed for several commercial polarizing glass products. It will be observed that a product having a center wavelength at 1310 nm requires a stress level around 3400 psi. The lower line B presents data for a new high temperature heat treatment of 750° C. for 8 hours. This cycle is in accordance with the present invention. In this case, the stress level needed to achieve 1310 nm center wavelength is only about 1600 psi. This is a significant reduction in the amount of energy and associated manufacturing costs, without substantial change in product quality or performance.

Figure 2:
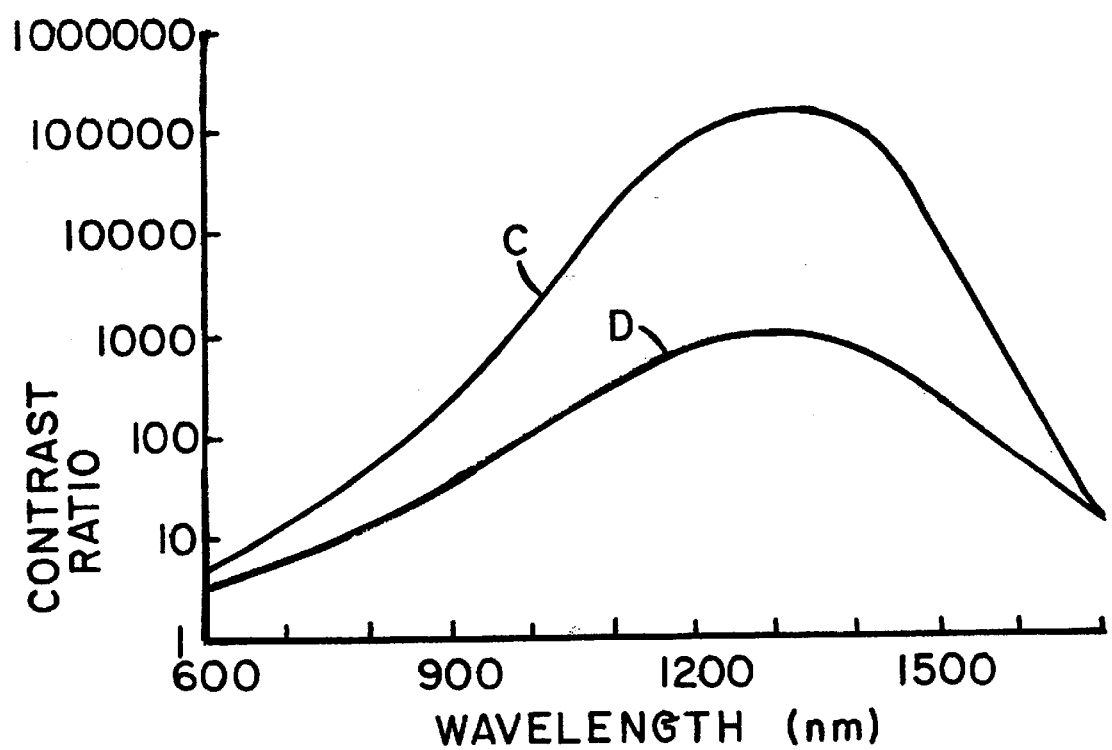
FIG. 2 is a graphical representation of a typical contrast ratio curve obtained with the present invention as compared to a similar curve obtained with prior practice.

A second feature achieved by the new heat treatment process is a wider dispersion of crystal sizes. Thus, a flatter contrast absorption curve over a wider wavelength band is obtained than that normally obtained with the prior lower temperature heat treatment process. This relationship is illustrated in FIG. 2. FIG. 2 is a graphical representation of dispersion in which Contrast Ratio is plotted on the vertical axis and wavelength is plotted in nanometers (nm) on the horizontal axis. The upper curve C shows the relationship of contrast ratio to wavelength for a commercial polarizing glass article. This article was processed on a schedule of 710° C. for 4 hours to precipitate halide crystals. The lower curve D shows the same relationship for the same article produced from the same glass, but heat treated at 750° C. for 8 hours to develop halide crystals in accordance with the method of the present invention. It is apparent that curve D is a broader, flatter curve.

An indirect measure of the size and extent of halide crystallization, the degree of optical transmittance and the extent of light scattering (haze) is used to monitor the effect of a particular heat treatment. This glass composition would normally fall into the range of 10–20% haze if treated at 50° C. above the softening point. Treatments at approximately 90° C. or greater than the softening point render haze readings, which have reached 100%. In a similar way, a heat treatment at 50° C. above the softening point yields a transmission ($T_{max}$) of approximately 91 to 93% for this glass. A much higher heat treatment of 90° C. above the softening point lowers $T_{max}$ about 84–88%. Still higher heat treatments continue to lower the transmission.

Figure 3:
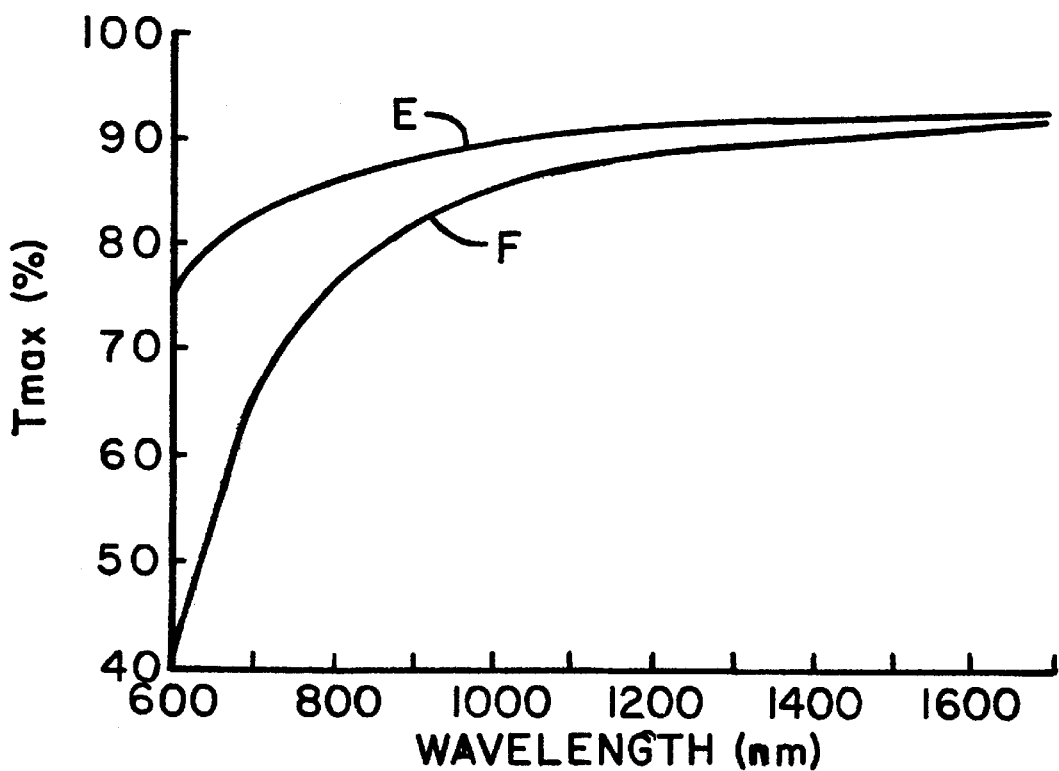
FIG. 3 is a graphical representation comparing maximum transmission values for a polarizing article produced in accordance with the present invention as compared to one produced in accordance with prior practice.

Any penalty in lowered transmission for polarizing glass products made with the higher heat treatment process is small as long as the transmitting wavelength is high (longer wavelength). This effect is depicted in FIG. 3, which compares the wavelength dependence on transmission for the usual 710° C./4 hour treatment as upper curve E represents, to the new high temperature treatment of 750° C./8 hours, lower curve F. FIG. 3 is a graphical representation of transmission, in which maximum transmission ($T_{max}$) is plotted on the vertical axis in terms of percent (%), and wavelength is again plotted in nanometers (nm) on the horizontal axis.

The new method does not adversely affect the transmission capability of the glass articles. As evident from FIG. 3, the difference in transmission loss becomes less than 10% at wavelengths above about 800 nm in the infrared, and becomes insignificant above about 1100 nm. At about 850 nm to about 900 nm, the glass articles of the present invention exhibit a maximum transmission of about 80 percent, and at about 1310 nm, a maximum transmission of about 84 percent. Above the wavelength of about 1450–1480 nm, there is virtually no different between the transmission of glass articles of the present invention and those currently known.

Thus, to reiterate, the present invention comprises a method of making a polarizing article. The method comprises a number of steps. First, provide a glass containing a source of silver, copper, or copper-cadmium and a halogen. Second, subject the glass to a temperature of at least about 76° C. or greater above the softening point of the glass, thereby thermally forming and precipitating halide crystals that have a size in the range of about 200–5000 Å in the glass. Third, elongate the glass under a stress at a temperature between the glass strain point and softening point, and shape from the glass a polarizing article having a broad, flat, band of contrast no greater than about 1000 in the infrared region of the electromagnetic spectrum. The elongating stress is sufficient to impart to the halide crystals an aspect ratio of at least 5:1. The polarizing article preferably has a maximum transmission of about 80 percent at about 850 nm, and preferably has a center wavelength of about 1310 nm. The polarizing article exhibits a maximum transmission of greater than about 84 percent at about 1310 nm. The method further comprises subjecting the glass to a time-temperature cycle in which the glass has a viscosity of not less than $10^5$ poise and a time duration of not over 20 hours. Further the elongated glass is exposed to a reducing atmosphere at a temperature over 250° C., but not over 25° C. above the glass annealing point, to form silver, copper, or copper-cadmium metal particles in a surface layer on the article. The stress applied preferably is not over about 3000 psi, preferably not over about 2600 psi, and more preferably not over about 1900–2200 psi.

The glass employed may be any glass that can be phase-separated to form silver, copper, or copper-cadmium crystals in the glass. Such glasses are disclosed, for example, in U.S.

Pat. Nos. 4,190,451 (Hares et al.) and 3,325,299 (Araujo) disclosing photochromic glasses and 5,281,562 (Araujo et al.) disclosing non-photochromic glasses. Each of these patents is incorporated by reference, particularly for its teaching of glass composition ranges and their production. Preferred glasses are those disclosed in the Hares et al. patent. The glass employed in making test pieces to obtain the data presented in the drawings has the following composition in weight percent as calculated from the batch on an oxide basis:

| | | | |
|---|---|---|---|
| $SiO_2$ | 56.3 | $ZrO_2$ | 5.0 |
| $B_2O_3$ | 18.2 | $TiO_2$ | 2.3 |
| $Al_2O_3$ | 6.2 | Ag | 0.24 |
| $Na_2O$ | 5.5 | CuO | 0.01 |
| $Li_2O$ | 1.8 | Cl | 0.16 |
| $K_2O$ | 5.7 | Br | 0.16. |

The present invention has been described in detail. It is understood that those skilled in the art may make changes and variations to an embodiment of the invention without departing from the spirit and scope of the invention which is defined by the following claims.

We claim:

1. A method for producing a polarizing glass article, the method comprising:
   a) providing a glass article containing a source of silver, copper, or copper-cadmium and at least one halogen other than fluorine or a combination thereof;
   b) subjecting the glass article to a time temperature cycle in which the temperature is greater than 76° C. above the softening point of the glass and the time is about 8–20 hours to form and precipitate silver, copper, or cadmium halide crystals in the glass, the crystals ranging in size between about 200–5000 $A^0$;
   c) applying a stress of not over about 2675 psi to the glass article while the glass is at a temperature above the strain point of the glass to elongate the glass article and the halide crystals therein;
   d) exposing the elongate glass article to a reducing atmosphere at a temperature above about 250° C., but no higher than about 25° C. above the glass annealing point, to reduce at least a portion of the elongated halide crystals in a surface layer on the glass article to metal particles.

2. The method according to claim 1, further comprising subjecting the glass to a time-temperature cycle in which the glass has a viscosity of not less than $10^5$ poise 3. The method according to claim 1, wherein the temperature is about 77° C. above softening point.

4. The method according to claim 1, wherein the stress applied is not over about 1900–2200 psi.

5. The method according to claim 1, wherein said polarizing article has a maximum transmission of about 80 percent at about 850 nm.

6. The method according to claim 1, wherein the method comprises the use of a reducing gas at an elevated pressure.

7. The method according to claim 1, wherein the glass is subjected to a time-temperature cycle in which the glass has a viscosity of about $10^5$ poise, the temperature is greater than 77° C. above the glass softening point.

8. The method according to claim 1, wherein the stress applied is not over about 2500 psi.

9. The method according to claim 1, wherein the elongating stress is sufficient to impart to the halide crystals an aspect ratio of at least 5:1.

10. The method according to claim 1, wherein said polarizing glass article has a center wavelength of about 1310 nm.

11. The method according to claim 1, wherein said polarizing glass article exhibits a maximum transmission of greater than about 84 percent at about 1310 nm.

12. A method according to claim 1, wherein the glass article exhibits a broad band of contrast in the infrared region of the electromagnetic spectrum, and a maximum transmission of greater than 80 percent.

* * * * *

UNITED STATES PATENT AND TRADEMARK OFFICE
CERTIFICATE OF CORRECTION

PATENT NO. : 6,536,236 B2
DATED : March 25, 2003
INVENTOR(S) : David G. Grossman et al.

It is certified that error appears in the above-identified patent and that said Letters Patent is hereby corrected as shown below:

<u>Column 7,</u>
Line 35, delete "A$^0$" and add -- Å --

<u>Column 8,</u>
Line 21, add -- and -- after "poise,"

Signed and Sealed this

Second Day of March, 2004

JON W. DUDAS
*Acting Director of the United States Patent and Trademark Office*